Jan. 14, 1936.　　　　P. P. PIPES　　　　2,027,614
APPARATUS FOR BONDING RAILS
Filed April 17, 1934
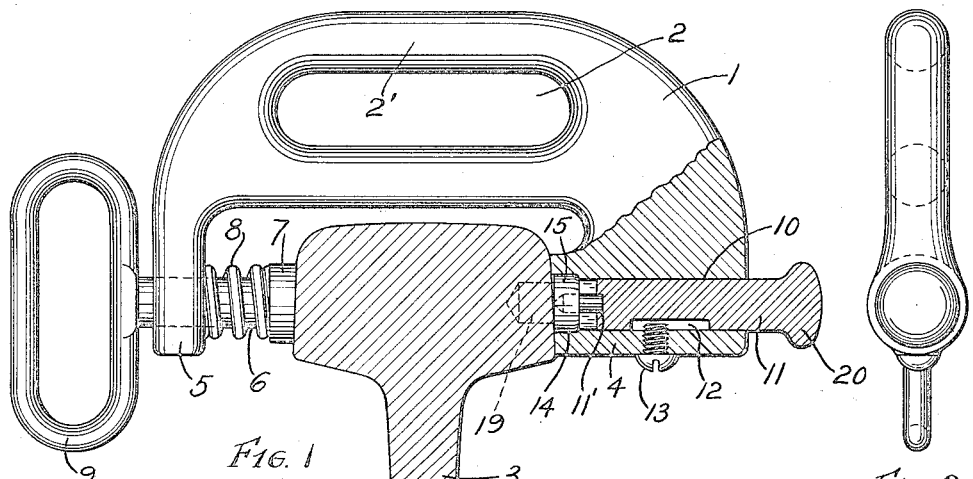
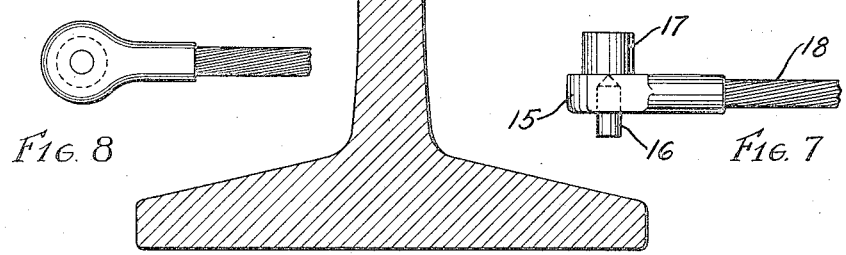
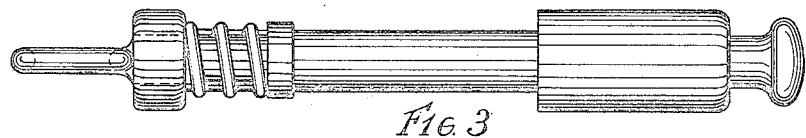
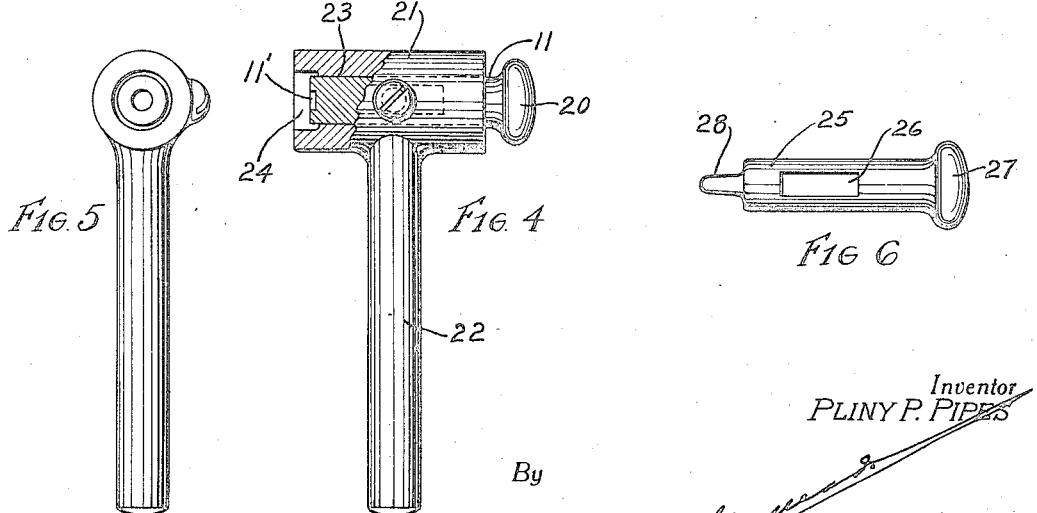
Inventor
PLINY P. PIPES
By
Attorney Patented Jan. 14, 1936

2,027,614

UNITED STATES PATENT OFFICE 2,027,614

APPARATUS FOR BONDING RAILS

Pliny P. Pipes, Mansfield, Ohio, assignor to The Ohio Brass Company, Mansfield, Ohio, a corporation of New Jersey Application April 17, 1934, Serial No. 721,063

8 Claims. (Cl. 1—47)

My invention relates to apparatus and method of installing rail bonds, and particularly of the type of bond known as the pin-driven or expanded bond.

One object of my invention is to provide a very simple device for maintaining the pin used in expanding the bond in a normal position while it is being forced into the bond terminal in installing the bond on a rail.

Another object of my invention is to provide a method of installing bonds of the pin-expanded type whereby it is not necessary to manually hold the pin while it is being driven.

One of the objections to a so-called pin-driven or expanded terminal bond is that the operator, if he is careless, does not drive the pin properly and if this is not done the proper expansion will not be secured and the terminal will not have the proper contact with the rail and, therefore, not only the electrical but the mechanical efficiency of the bonding will be greatly reduced.

With the larger types of bonds it is possible for the operator to hold the pin in position while the first few blows upon the same are struck, but with bonds of the smaller type such as are now used in bonding rails for signal purposes, the pins are so small that it is practically impossible for an operator to hold the pin while the first few blows are struck without having his fingers also struck.

It is not always desirable to have the pins of such a size that they will fit the opening in the head of the bond tightly when they leave the factory; while it is true in some cases, in others it is desirable to have the pin slightly smaller than the hole through the head of the terminal.

In order to compel the pin to be applied properly I have devised an apparatus to be clamped to the rail and in conjunction with the bond terminal whereby the pin is held in position mechanically while it is being forced into the bond terminal.

My invention resides in the new and novel construction, combination and relation of the parts hereinafter described and shown in the accompanying drawing, and also in the steps employed in applying rail bonds by means of the apparatus.

In the drawing:—

Fig. 1 is a transverse sectional view of a rail showing my invention in partial section as applied to the rail in combination with a bond terminal.

Fig. 2 is an end view of my bonding tool only.

Fig. 3 is a bottom view of my bonding tool.

Figs. 4 and 5 are side and end views, the former in partial section, of a modification of the tool shown in Fig. 1.

Fig. 6 is a modified form of plunger which may be used with the tool shown in Fig. 1 or Fig. 4.

Fig. 7 is a side view of a bond terminal showing a pin secured thereto before being driven to its final position.

Fig. 8 is a face view of Fig. 7.

In the preferred embodiment of my apparatus for installing bonds, I provide a body portion 1 having an opening 2 constituting a hand grip for convenience in carrying or placing the tool in position on the rail 3.

The body has downwardly projecting lugs 4 and 5.

The lug 5 is orificed and there is mounted therein a sliding holding member 6 having an enlarged end 7 to engage the rail 3. The holding member 6 is moved to its advanced position by means of a spring 8 positioned between the members 5 and 7.

Attached to the outer end of the member 6 is a handle 9 which may be secured to the member 6 by either welding or a screw or bolt attachment. The handle 9 is convenient in retracting the member 6 against the tension of the spring 8.

The lug 4 is provided with a thru-orifice 10 in which is slidably mounted a drive member 11 provided with a slot 12 in which is positioned the end of a screw 13 which prevents withdrawal of the drive member 11 without preventing its necessary sliding action.

The inner end of the lug 4 is shown somewhat enlarged at 14 to receive the head 15 of the bond to be applied to the rail. The inner end of the drive member 11 is recessed at 11' to receive and steady the end of the pin 16. The bond to be installed is shown in Figs. 7 and 8 and comprises the head 15 with the stud 17 projecting therefrom and cable 18. The cable 18 is made of required length and at the opposite end is a terminal secured thereto the same as shown in Fig. 7. The end of the head 15 is orificed to receive the pin 16 either tightly or loosely as desired. The end of the pin may project into the stud 17 slightly if desired.

The spring 8 acting upon the holding member 6 requires the proper positioning of the lug 4 before the member 11 is forced forward since the pull on the handle 9 to position the device and the pressure of the holding member 6 against the rail will in each case hold the lug 4 in position thus the member 11 cannot well be operated until the device is positioned relative to the bond.

In order to apply bonds by the use of the above described tool, the rail is first drilled with an opening 19 to receive the stud 17. The bond terminal is then positioned against the side of the rail 3 with the stud 17 projecting into the opening 19. The tool is then applied in the position shown in Fig. 1 and in doing so the member 6 is withdrawn through the use of the handle 9 against the tension of the spring 8 and the opening 14 then positioned relative to the bond terminal head 15. With the tool in proper position the handle 9 is released and the tension of the spring 8 will advance the member 6 with the member 7 in contact with the rail, thus holding the device in position with the head 15 of the bond terminal positioned in the opening 14 of the tool and held tightly in position relative to the rail and with the pin 16 having its free end in alignment with or positioned in the counterbore 11'.

The operator then applies the blows preferably with a hammer to the enlarged end 20 of the drive member 11 and these blows are continued until the pin 16 has been driven to its final position which is indicated by the end of the member 11 contacting with the face of the bond head 15.

It will be evident that in forcing the pin into position it is securely held relative to the bond terminal and its axis is maintained coincident with that of the terminal thus preventing the pin being driven with its axis obliquely disposed to that of the bond terminal.

The modifications shown in Figs. 4 and 5 are for holding the device in position manually and comprise the barrel portion 21 and handle 22 secured thereto. The drive member 11 is shown to be the same as in Fig. 1 and slidably mounted in the passage 23 and having enlarged portion 24. In the use of the tool shown in Figs. 4 and 5 it is held in position by means of the handle 22 while the operator strikes the enlarged end 20 of the plunger 11. The free end of the pin 16 is guided by means of the countersink 11' the same as in the case of Fig. 1.

In Fig. 6 I have shown a modified form of drive member consisting of the plunger 25 with the slot 26, enlarged head 27 and an integrally formed projecting stud 28.

When the plunger 25 is used in place of the drive member 11, the pin 16 is not used, but the member 28 is positioned in the head of the bond such that when end 27 of the drive member is struck the portion 28 will be forced into the bond terminal and expand the stud portion the same as in the case of the pin 16. In this case, however, there is no pin remaining in the bond terminal after installation.

There are modifications to my invention which will be suggested to those skilled in the art, therefore, I wish to be limited only by my claims.

I claim:—

1. A bonding tool comprising a yoke-shaped frame to receive the head of a rail between its spaced arms, one arm having a slidably mounted holding member to engage one side face of the rail head, a spring urging the holding member to its advanced position, the other arm of the frame having a through passage with one opening opposite the other side face of the rail head, the passage at the rail end arranged to receive and fit the head of the bond, a sliding drive member mounted in the passage and one end projecting therefrom and having a counter-sink in the end of the other end of the driving member to receive the end of a pin to be driven into the terminal, the spring advanced holding member holding the tool in position on the rail with the bond head mounted in the said end of said passage.

2. A bonding tool comprising a yoke-shaped frame to receive the head of a rail between its spaced arms, one arm having a through passage, a driving tool slidably mounted in the passage with one end projecting from the passage to receive hammer blows, means on the said arm to receive the head of a bond terminal to be installed with one opening of the said passage opposite the bond head, the other arm having means to engage the head of the rail and a spring acting upon the said means to advance it into contact with the rail and draw the first said arm towards the rail to hold the tool in position on the rail head.

3. A bonding tool comprising a yoke-shaped frame to receive the head of a rail between its spaced arms, one arm having a through passage, a driving tool slidably mounted in the passage with one end projecting from the passage to receive hammer blows and the face of the other end arranged to receive the end of a pin to expand the bond terminal, means on the said arm to receive the head of a bond terminal to be installed with one opening of the said passage opposite the bond head, the other arm having means to engage the head of the rail and a spring acting upon the said means to advance it into contact with the rail and draw the first said arm towards the rail to hold the tool in position on the rail head.

4. A bonding tool comprising a body member, means on the body to engage the head of a bond terminal, a passage through a portion of the body and so positioned that one opening is opposite the head of the bond terminal, a drive member slidably mounted in the passage with one end projecting from the passage and arranged to receive hammer blows thereon to force the drive member towards the bond terminal, means on the body to engage the head of a rail to hold the tool in position on the rail head and means cooperating with the last said means requiring the first said means to engage the bond before the drive member is forced forward.

5. A bonding tool comprising a body member, means on the body to engage the head of a bond terminal, a passage through a portion of the body and so positioned that one opening is opposite the head of the bond terminal, a drive member slidably mounted in the passage with one end projecting from the passage and arranged to receive hammer blows thereon to force the drive member towards the bond terminal, means on the body member to coact with means on the drive member to limit the sliding movement of the drive member and slidable yielding means on the body to engage the head of a rail to hold the tool in position on the rail head and in engagement with the bond terminal prior to the operation of the drive member.

6. A bonding tool comprising a body member, means on the body to engage the head of a bond terminal, a passage through a portion of the body and so positioned that one opening is opposite the head of the bond terminal, a drive member slidably mounted in the passage with one end projecting from the passage and arranged to receive hammer blows thereon to force the drive member towards the bond terminal, means of reduced diameter projecting from the end of the drive member opposite the drive end to enter the terminal and expand the same as the drive member advances under the hammer blows and means on the body to engage the head of a rail to hold the tool in position on the rail head.

7. A tool for use in bonding rails comprising a yoke-shaped frame to receive the head of a rail between its spaced arms, one arm having means to receive a bond terminal to hold it in fixed relation relative to the rail and tool, a passage through one portion of the body and so positioned that one opening is opposite the terminal of the bond, a drive member slidably mounted in the passage with one end projecting from the passage and arranged to receive hammer blows thereon to force the drive member towards the terminal and means interposed between the drive member and the terminal to be forced into the terminal to expand the same as the drive member moves under the force of the hammer blows and yielding means on the other arm of the frame requiring the positioning of the tool prior to the interposed means being forced into the bond terminal.

8. A tool for applying rail bonds to rails comprising a yoke-shaped frame to receive the head of a rail between its spaced arms, a passage through one portion of the body and so positioned that one opening is opposite the terminal of the bond, a drive member slidably mounted in the passage with one end projecting from the passage and arranged to receive hammer blows thereon to force the drive member towards the terminal and means of less diameter and length than of the drive member and forming a part of the drive member interposed between the drive member and the terminal to be forced into the terminal to expand the same as the drive member moves under the force of the hammer blows and means on the frame to hold the tool in position while the interposed means is being forced into the bond terminal.

PLINY P. PIPES.